United States Patent [19]
Blonder et al.

[11] Patent Number: 5,578,101
[45] Date of Patent: Nov. 26, 1996

[54] METHOD OF MAKING A SOL-GEL GLASS BODY AND REMOVING SAME FROM MOLD

[75] Inventors: Greg E. Blonder; Robert P. Frankenthal, both of Summit; David W. Johnson, Jr., Bedminster; Eliezer M. Rabinovich, Berkeley Heights, all of N.J.

[73] Assignee: Lucent Technologies Inc., Murray Hill, N.J.

[21] Appl. No.: 522,808

[22] Filed: Sep. 1, 1995

[51] Int. Cl.⁶ ............................................. C03B 37/016
[52] U.S. Cl. ................... 65/17.2; 65/395; 65/24; 65/495; 264/430; 264/405; 423/338
[58] Field of Search .................... 65/17.2, 395, 495, 65/24, 17.6, 30.12, 29.18, 31, 63, 102; 423/338; 264/430, 405

[56] References Cited

U.S. PATENT DOCUMENTS

| | | |
|---|---|---|
| 4,680,047 | 7/1987 | Clasen et al. ............... 65/17 |
| 4,684,385 | 8/1987 | Clasen ......................... 65/17 |
| 4,806,137 | 2/1989 | Virey .......................... 65/26 |
| 5,004,626 | 4/1991 | Dong et al. .................. 427/58 |
| 5,021,369 | 6/1991 | Ackerman et al. ........... 501/95 |
| 5,240,488 | 8/1993 | Chandross et al. ........... 65/3.11 |
| 5,322,725 | 6/1994 | Ackerman et al. ........... 428/137 |

*Primary Examiner*—Donald E. Czaja
*Assistant Examiner*—Jacqueline A. Ruller
*Attorney, Agent, or Firm*—Eugen E. Pacher

[57] ABSTRACT

The disclosed method of making a glass body by a sol/gel process comprises electrochemically assisted release of the gel body from the mold in which the body was formed. More specifically, the method involves gelation of a sol in a mold that comprises a first conductor member, with a second conductor member also being in contact with the sol and/or gel, and causing the flow of a current between the first and second conductor members, with the first member being the cathode. In consequence of the current flow a substantially liquid lubricating layer that facilitates removal of the gel body from the melt exists at the cathode/gel interface.

7 Claims, 1 Drawing Sheet

METHOD OF MAKING A SOL-GEL GLASS BODY AND REMOVING SAME FROM MOLD

FIELD OF THE INVENTION

This invention pertains to making a glass body, typically a high silica glass body, by a sol-gel method.

BACKGROUND OF THE INVENTION

Methods of making glass bodies by a sol-gel process are known, and some of the methods have facilitated making of glass bodies of substantial size. See, for instance, U.S. Pat. No. 5,379,364, incorporated herein by reference. For instance, the method can be used to make high silica (typically >85 weight % $SiO_2$) bodies for use in optical fiber manufacture.

It is frequently not easy to remove a gel body from the mold in which it was produced, due to adhesion of the gel to the mold. In case the body has a simple shape (e.g., rod or tube) release can typically be accomplished by pushing the body out of the mold with the aid of a plunger inserted from one end. However, this approach obviously cannot be applied if the mold is not open at both ends, or if the shape is complex. Furthermore, the problem is aggravated by the typically relatively low strength of the wet gel body. Sol-gel methods could be advantageously used in the manufacture of high silica glass bodies of relatively complex shape (e.g., crucibles, rings), if the above referred-to release problem could be overcome. This application discloses a method of making a sol-gel body that overcomes the release problem.

THE INVENTION

Figure 1:
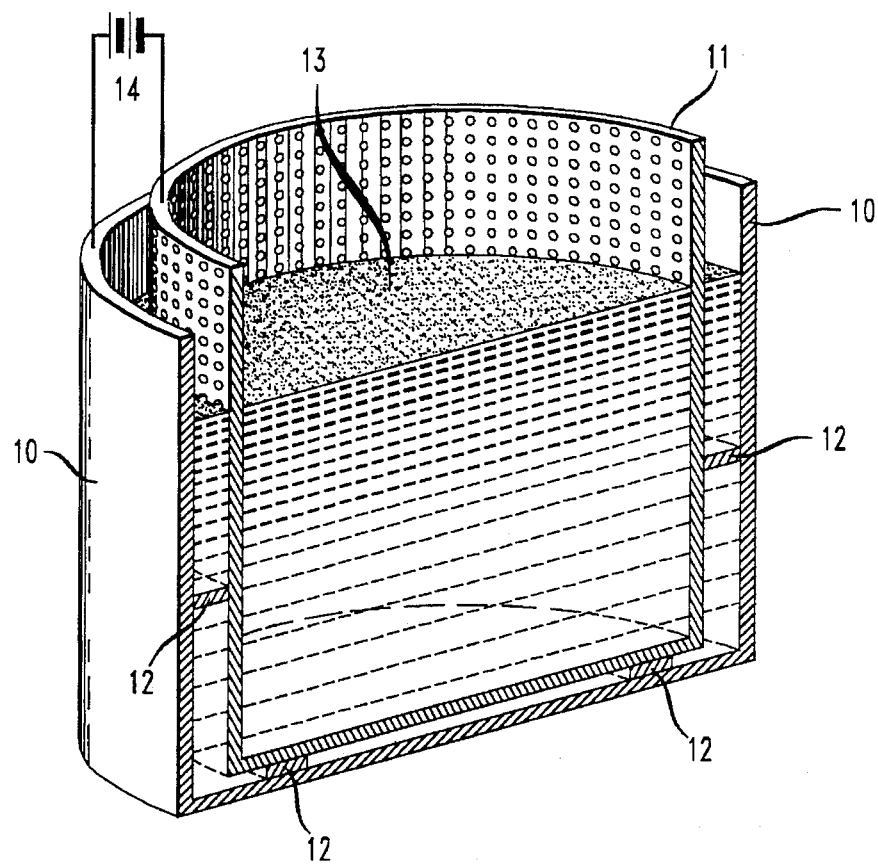
FIGS. 1 and 2 schematically depict exemplary embodiments of the invention.

The invention is described below in terms of a particular class of embodiments, namely, making high silica (i.e., >85% by weight $SiO_2$) bodies from a sol that comprises $SiO_2$ particles, e.g., fumed silica. These embodiments are preferred, but the invention is not so limited and, at least in principle, can be practiced with other sol-gel processes, e.g., the alkoxide process.

Broadly speaking, the invention is embodied in a method of making a glass body by a process that comprises gelling of a sol in a mold, and further comprises electrochemically-assisted release of the resulting gel body from the mold. The released gel body is then processed in conventional manner.

More specifically, the invention is embodied in a method of making a glass body that comprises causing a quantity of a sol to gel in a mold such that a gel body results, removing the gel body from the mold, and processing the gel body such that the glass body results.

Significantly, the mold comprises a first conductive member, with the first and a second conductive member being in contact with the gel body, and the method further comprises causing an electric current to flow between said first and second conductive members such that, during at least a part of the step of gel body removal from the mold, a substantially liquid layer exists at an interface between the gel body and the first conductive member, whereby removal of the gel body from the mold is facilitated.

2

The first conductive member can be all or part of the mold. The current can be caused to flow after completion of gelation (resulting in localized reversal of the gelation process). Instead of flowing the current after gelation, or in addition thereto, current can be caused to flow during all or part of the gelation process, and possibly even before commencement of gelation (resulting in local inhibition of the gelation). Flowing the current after completion of gelation has typically given the best results and is currently preferred.

By a "mold" we mean herein a member that defines the shape of the gel body that is formed therein. The mold can be coextensive with the first conductive member, or the latter can be a part of the former. Current can be caused to flow between the first and second conductive members by any appropriate means, e.g., by connecting between the two members a voltage source, a current source, or any source that is neither a pure voltage source or current source.

The inventive method is based on the recognition that gelation of a sol typically is pH-dependent. For instance, an exemplary particulate silica sol (e.g., an aqueous dispersion of fumed silica particles) does not gel at pH>10, but gels readily at pH ~9.5 or less. The method also utilizes the discovery that gelation can be prevented or reversed locally by electrochemical means. More specifically, it has been discovered that, by causing the flow of a current between two electrodes in contact with the sol (gel), gelation of the sol at the cathode/sol (gel) interface can be prevented (reversed).

We currently believe that water is oxidized at the anode to form oxygen gas and hydrogen ions, with attendant decrease in pH, and water is reduced at the cathode to form hydrogen gas and hydroxyl ions, with attendant increase in pH. Regardless of the operative mechanism, current flow between anode and cathode can result in the presence of substantially liquid material at the cathode/gel interface. The presence of this liquid material can facilitate removal of the gel body from the mold, if the cathode is all or part of the mold. Exemplarily the current is caused to flow by application of a DC voltage in the range 1–50 V between the two conductive members.

In the examples below, the sol was prepared as described in U.S. Pat. No. 5,379,364, Example 1, except that neither polyethyloxazoline nor glycerine were added. By way of example, 250 gram aqueous dispersion containing 46 wt. % of fumed silica with surface area ~50 $m^2/g$ was mixed with 12.9 gram of a 25% aqueous solution of TMAH (tetramethyl ammonium hydroxide) to raise the pH to ~12. After mixing and aging for ~20 hours, 2.4 gram of methyl formate was added, and the sol was poured immediately into an appropriate mold. After completion of gelation and release of the gel body from the mold, the gel body can be processed into a glass body substantially as described in the '364 patent.

EXAMPLE 1

A cylindrical aluminum mold (10 cm outside diameter, 9.5 cm inside diameter, 4.5 cm high) was provided. The sol was poured into this mold, two platinum strips were partially immersed in the sol and connected to the positive terminal of a 9 V battery. The negative terminal of the battery was connected to the aluminum mold. Upon gelation (about 10 minutes) of substantially all of the sol, the battery was disconnected and the platinum strips were removed. The resulting cylindrical gel body separated readily from the mold upon turning over of the mold, indicating the presence of a substantially liquid layer at the mold/gel interface.

EXAMPLE 2

A compound vessel as shown in FIG. 1 was provided. Numerals 10–14 refer, respectively, to a cylindrical aluminum outer container, a perforated aluminum mold, insulating spacers separating the container and the mold, the sol, and means for causing current flow, e.g., a battery. Sol was poured into the compound vessel. The positive terminal of a 9 V battery was connected to the outer container, and the negative terminal was connected to the mold. This configuration was expected to result in more uniform current distribution than the arrangement of Example 1, and in convection of sol through the perforations of the mold, thereby resulting in "lubrication" of the mold from both sides. After essentially complete gelation, the gel body was easily removed from the mold by removing the mold with the gel body therein from the outer container, leaving some waste sol/gel between the container and the mold. Then the mold was turned upside down, causing the gel body to slide out of the mold.

EXAMPLE 3

The process was as in Example 2, except that the mold was made of porous bronze, resulting in smooth gel body surfaces without use of filter paper.

EXAMPLES 4 AND 5

The processes were as in Example 2, except that, respectively, the battery was connected after 8 minutes of the gelation process for about 5 minutes, and that the battery was connected for about 10 minutes upon completion of gelation. In both cases the gel body could be easily removed from the mold.

EXAMPLE 6

The process was as in Example 2, except that a DC power supply was used (2 V, about 10 A). The resulting gel body could be easily removed from the mold.

EXAMPLE 7

The process was as in Example 2, except that no voltage was applied until completion of gelation, followed by application of 40 V for about 30 seconds. The gel body could be easily removed from the mold.

EXAMPLE 8

Figure 2:
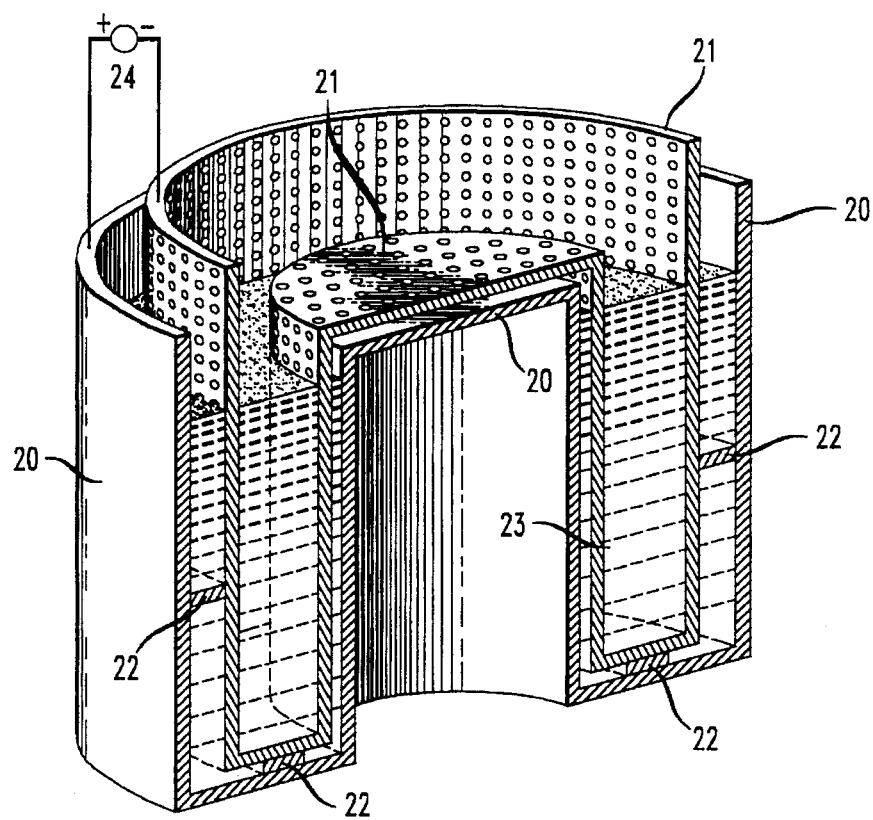

A cylindrical compound vessel, substantially as shown in FIG. 2, was made. Outer container 20 had 25 cm outer diameter, was 3 cm high and consisted of graphite. Perforated metal ring mold 21 was kept spaced from the container by means of insulator spacers 22. The spacing between outer container and mold was 2 mm. An approximately 1 kg batch of sol 23 was made as described, and poured into the vessel, filling it to a level below the top of the core of the mold. After 5 minutes of gelation, 12 V DC was applied by means of power supply 24, with the mold being the cathode. After completion of gelation, the mold with the gel body therein was removed, and the gel body was easily released from the mold by turning the mold upside down. The thus produced ring-shaped gel body is processed in conventional fashion into a ring-shaped clear silica body.

The invention claimed is:

1. Method of making a glass body, the method comprising
   a) causing a quantity of a sol to gel in a mold such that a gel body results;
   b) removing the gel body from the mold; and
   c) processing the gel body such that the glass body results; characterized in that
   d) the mold comprises a first conductor member, with said first and a second conductor member being in contact with the gel; and the method further comprises
   e) causing a current to flow between said first and second conductor members such that, during at least a part of step b), a substantially liquid layer exists at an interface between the gel body and the first electrode, whereby removal of the gel body from the mold is facilitated.

2. Method of claim 1, wherein the sol comprises an aqueous suspension of $SiO_2$ particles.

3. Method of claim 1, wherein step e) comprises application of a DC voltage between the first and second conductor members, the DC voltage being in the range 1–50 V.

4. Method of claim 1, wherein the first conductor member comprises a perforated metal member.

5. Method of claim 1, wherein the first conductor member comprises a porous metal member.

6. Method of claim 1, wherein the glass body is a high silica glass body.

7. Method of claim 6, wherein the glass body consists essentially of silica.

* * * * *